No. 687,143.  
P. FARNSWORTH.  
SYSTEM OF MOTOR CONTROL.  
(Application filed Apr. 22, 1901.)

(No Model.) 4 Sheets—Sheet 1.

Patented Nov. 19, 1901.

Fig. 1.

Witnesses:

Inventor.

No. 687,143. Patented Nov. 19, 1901.
P. FARNSWORTH.
SYSTEM OF MOTOR CONTROL.
(Application filed Apr. 22, 1901.)

(No Model.) 4 Sheets—Sheet 2.

Witnesses. Inventor

No. 687,143. Patented Nov. 19, 1901.
P. FARNSWORTH.
SYSTEM OF MOTOR CONTROL.
(Application filed Apr. 22, 1901.)
(No Model.) 4 Sheets—Sheet 3.

Witnesses
Robt C. Chapman
Benjamin B. Hull

Inventor
Philip Farnsworth

Fig. 10.

UNITED STATES PATENT OFFICE.

PHILIP FARNSWORTH, OF SCHENECTADY, NEW YORK, ASSIGNOR TO GENERAL ELECTRIC COMPANY, A CORPORATION OF NEW YORK.

SYSTEM OF MOTOR CONTROL.

SPECIFICATION forming part of Letters Patent No. 687,143, dated November 19, 1901.

Application filed April 22, 1901. Serial No. 56,815. (No model.)

*To all whom it may concern:*

Be it known that I, PHILIP FARNSWORTH, a citizen of the United States, residing at Schenectady, county of Schenectady, State of New York, have invented certain new and useful Improvements in Systems of Motor Control, (Case No. 1,771,) of which the following is a specification.

This invention is a novel means for controlling a plurality of electric machines acting as motors to drive a load, and comprises means whereby any desired portion of the motors connected with the load through a variable connection or clutch can have its counter electromotive force varied by the inertia of the load to vary the potential around another portion of the motors rigidly connected with the load.

It has been known for many years that the electromotive force at the terminals of a motor could be varied for the purpose of varying the speed of the motor by varying the speed of a secondary motor connected in series with it. This knowledge has hitherto been applied for the purpose of controlling the speed of a single primary motor without the application of mechanical brakes or the interposition of a variable exterior or dead resistance. For this purpose the secondary motor has been of relatively small size and not connected to any load, so that as it had little inertia it could readily speed up when supplied with the line-current without the necessity of exterior dead resistance to prevent a short circuit through it. The small motor in this condition served as a substitute for an exterior dead resistance in series with the primary motor, since when the small motor speeded up it generated a considerable counter electromotive force opposed to the line, which prevented a high potential at the primary motor and permitted the latter to gradually speed up under load without short-circuiting. To increase the speed of the primary motor, the speed of the small auxiliary motor was diminished by a mechanical brake or other suitable means. Since the speed of the small motor could be varied as desired, there was thus provided a means for regulating the large motor without the use of a mechanical brake or exterior dead resistance. It was hoped that this method of control would supersede the wasteful straight rheostatic control; but owing chiefly to the facts that an auxiliary motor was required in each case and that there was a considerable loss of energy in braking the auxiliary motor the rheostatic method is yet largely employed with or without methods of grouping a plurality of motors to vary their speed and torque. The idea of this invention is to retain the primary motor rigidly connected to the load as before and to increase the size of the small and hitherto idle auxiliary motor, which serves as the generator of counter electromotive force, so that it may be adapted to coöperate with the primary motor to drive the load. To obviate the energy loss in braking the auxiliary motor which has hitherto been considered necessary in order to decrease its speed and reduce its counter electromotive force, I purpose to provide a suitable variable connection or clutch between the second motor and the load, which connection may be and preferably is an electrically-actuated clutch, and thus to cause the inertia of the load to act as a brake for reducing the speed and counter electromotive force of the second motor. The moment of the second motor, which has speeded up while serving in place of a resistance in series with the primary motor, thus subserves the useful function of aiding the primary motor in driving the load and also the speed and counter electromotive force of the second motor are reduced, whereby the potential at the primary motor and the speed thereof are increased. When the speed of the loosely-mounted motor is gradually reduced by gradually connecting it with the load, the effective potential at the loosely-mounted motor is correspondingly increased, as well as that of the rigidly-connected motor. Thus while the rigidly-connected motor is continually driving the load with increasing energy the loosely-mounted motor is going through a peculiar cycle of changes. First, it is supplied at no load with the electromotive force of the line. Then it speeds up, so that it cuts down such electromotive force. Next it is gradually connected to the load, so that its speed and counter electromotive force are reduced, and finally it is fully connected with the load to coöperate with the rigidly-connected motor. Thus while its speed is being reduced by its connection with the load it has an opposing tendency to increase in speed in accordance with the increase of potential at its terminals. An additional advantage of this system is that there is provided a rigid connection for a portion of the motors with the load whereby the latter can be instantly started in the usual manner and without the disadvantage of friction losses, which would occur were all the motors provided with variable connections with the load. Also the first cost and subsequent expenditure of energy to operate such additional variable connections are obviated.

The idea of employing a motor serving as a generator of counter electromotive force to regulate another motor connected in series with it, both motors being adapted to drive the load, is by no means limited in its application to two motors, although this is the most valuable application in respect to the present railway practice, wherein two motors are adapted to operate each car. Neither is the invention limited in its application to the control of railway-motors, although for convenience such application is illustrated herein. The invention comprehends all cases in which one or more motors serving to generate counter electromotive forces are also employed to coöperate with another motor or motors to drive the load. Where there are only two motors, one of them may serve as the generator of counter electromotive force and the other be rigidly connected to the load in any suitable manner. Where there are more than two motors, one or more of them may be rigidly connected with the load or one or more may serve as generators of counter electromotive forces. The motors in any case may be series or shunt wound, although they are illustrated herein only as series motors, this being the preferable mode of winding for motors employed in railway-work.

There is shown herein the application of the invention to the common two-motor equipment for railway-cars, and while the invention is applicable to the control of such an equipment only in the series position of the two motors, the rheostatic control being necessary in their parallel position, nevertheless I believe that this particular embodiment will prove of utility, especially in connection with the invention disclosed in the application of F. E. Case for a braking system, Serial No. 5,690, filed March 25, 1900, of which invention I had no knowledge until some time subsequent to the conception of my invention.
It happens that the motors and electrically-actuated clutch of Case are well adapted for this particular application of my invention, and I have therefore shown herein the same apparatus, so far as these parts are concerned, as is shown in the application of Case, and the parts have been similarly lettered. The two inventions can be used with one controller constructed to fulfil the functions both of the Case controller and of the controller disclosed herein. A three-motor equipment, which is especially adapted for railway-work, is also disclosed herein and indicates the manner in which this invention can be applied as a substantially complete substitute for rheostatic control and also shows that the number of motors with which the invention may be used is immaterial. In this equipment the improved means for counter-electromotive-force regulation is mixed with the series-parallel method of control, with the result that a wide range of speeds is obtained without the use of exterior dead resistance. The only change involved so far as the motors themselves are concerned is that it may be desirable that the motor serving as the generator of counter electromotive force be suitably modified in its electrical construction in order to withstand the increased current flowing through its coils when the rigidly-connected motors are connected in parallel with each other. Hitherto the rheostatic and series-parallel methods have been combined, as shown in the United States Patent to Condict, No. 393,323; but I believe that I am the first to suggest the idea of combining the counter-electromotive-force method of control with the series-parallel method and to explain how such a combination can be executed in practice. Furthermore, as the counter-electromotive-force method of control is also adapted for combination with the rheostatic system or with the combined series-parallel and rheostatic system I believe I am the first to suggest such modified combination systems.

The economical importance of the invention is most marked in its application to railways where short runs are made, such as the ordinary trolley-roads or elevated railways. In such cases the speed-curve has a rapid rise for the acceleration and a gradual fall during the time after full speed has been attained and the power cut off and while the car or train is "coasting." It is thus evident that as the motors are not long supplied with current after the train has obtained full or nearly full speed an economical acceleration is of great importance. In substantially obviating the use of dead resistances the invention provides a means for the economical expenditure of energy.

Of the drawings,
Fig. 4 is a working diagram of the electrical connections of the apparatus at starting.

As noted above, Figs. 1, 2, and 3 show motors and an electrically-actuated clutch like those of the Case application, as this arrangement is well adapted for the embodiment of the invention to be hereinafter described.

Figure 1:
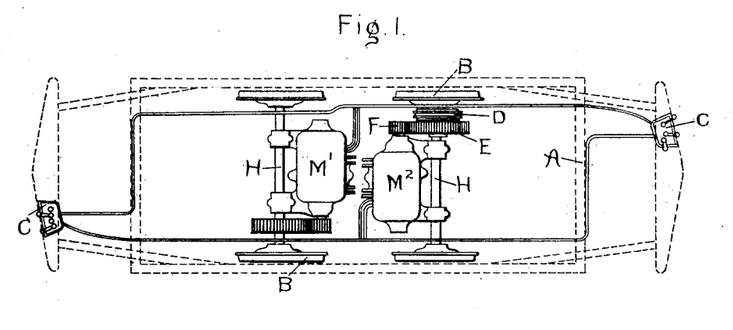
Figure 1 is a plan of an ordinary electric car, showing the apparatus mechanically arranged as in the application of Case noted above.
Figure 2:
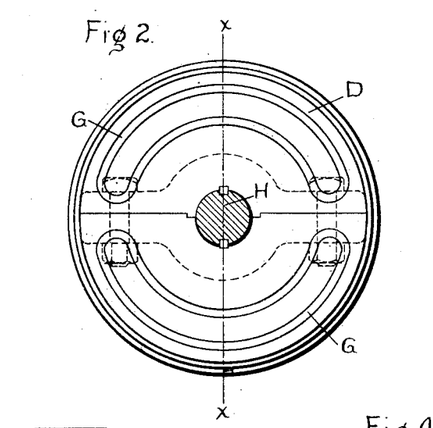
Figs. 2 and 3 are an elevation and sectional view, respectively, of the electrically-actuated clutch by means of which the generator of counter electromotive force is connected with the car-axle.
Figure 3:
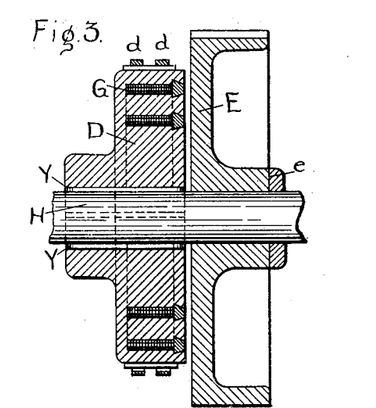

In Fig. 1, A represents the truck of an ordinary car which is provided with wheels B B, mounted on the axles H. The controllers, one of which is mounted on each end of the car, are indicated by C C, and the motors M' and M² are supplied with current through these controllers. One of the motors M' is adapted to drive the car by any suitable rigid connection, such as the common reducing pinion and gear. The motor M² is adapted to be also connected to its axle by an armature-pinion F and gear E; but the gear E is loosely mounted on the axle, so that the motor is normally disconnected from the latter. The gear E is preferably constructed with one face solid, as shown in Fig. 3, and it is prevented from end play by the collar $e$. This gear and its axle are adapted to be connected by some variable device, such as a friction or an electrically-actuated clutch, which will permit the parts to slip with respect to each other and which can be controlled to vary the degree of slip. For this purpose I preferably employ an electrically-actuated clutch, such as D, for the reason that it can be readily controlled by either motor-controller C. This clutch is splined to the axle by the keys Y Y and is provided with the ordinary coils G and collector-rings $d\ d$, by which the coils can be supplied with current. Whenever current is supplied to the magnet-coils G by the controller C, the member D is magnetized and attracts the gear E, so that the armature-pinion F in rotating the gear will rotate the axle H to drive the car. The degree of magnetization of the clutch can be varied by varying the amount of current supplied to it, and by this means the effective connection and degree of slipping between the motor and its load are varied.

Figure 4:
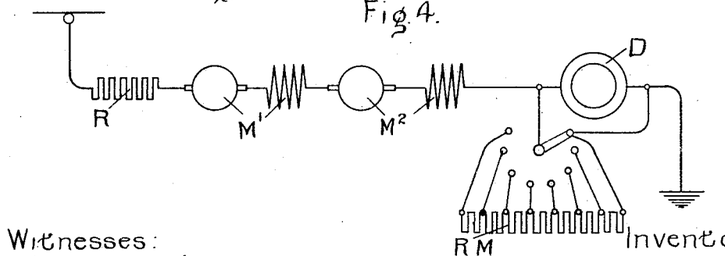
Figure 5:
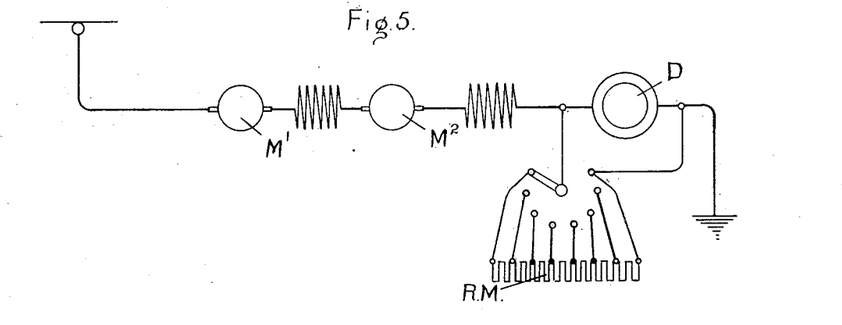
Fig. 5 is a working diagram of the electrical connections of the apparatus after starting.

In Fig. 4 are shown the electrical connections of the two series-wound railway-motors M' M², mechanically mounted, as shown in Fig. 1. At starting these motors are connected to the trolley through the resistance R temporarily, this resistance being retained in circuit only until the loosely-mounted motor M² has overcome its own inertia, which is considerably greater than has hitherto been the case with the small motors used for the purpose of counter-electromotive-force regulation, owing to the fact that the motor M² is adapted to coöperate with the other motor in driving the load. The electrically-actuated clutch D is short-circuited at starting, so that the motor M² has no connection with its axle. The return circuit may be as usual through the track-rails or any other suitable conductor. In Fig. 5 is shown the condition after the motor M² has speeded up, the motors being connected in series without resistance, and a very small resistance R M having subsequently been gradually inserted in a shunt around the electrically-actuated clutch D, so that the motor M² has been gradually connected to its axle. Sufficient resistance is in shunt to the clutch D to permit current to flow through the latter to fully energize it, so that the motor M² is rigidly connected to its axle and the motors are in full-series position, both coöperating to drive the car or other load. The current required to energize the clutch is so small as to be negligible in computing the cost of driving the load. When the controller connection is first made, the motor M', being rigidly connected to its axle, immediately starts to rotate its axle, but the motor M², being disconnected from its axle, speeds up so as to develop a considerable electromotive force opposed to the line. As soon as the latter motor speeds up the resistance R is cut out and the resistance R M gradually inserted in the shunt around the clutch. Thus the magnetization of the clutch is gradually increased and the axle H, which rotates at a considerably lower speed than the gear E, serves as a brake upon the gear through the clutch D, so that the speed of the motor M² is gradually reduced, and consequently its counter electromotive force also. Therefore the line potential around the motors is proportionately increased, and while the speed of the motor M² has been decreased when it began to drive its axle the increased line potential serves to gradually increase the speed of both motors. The application of the feature of counter-electromotive-force regulation is in this case limited to the control of the motors during their series connection, and recourse is had to the usual rheostatic control in the parallel position of the motors. However, if desired, the clutch can be cut out when the motors go into parallel and can then be gradually cut in again to obtain a gradual acceleration, although in such case the rigidly-connected motor would be considerably overloaded.

Figure 6:
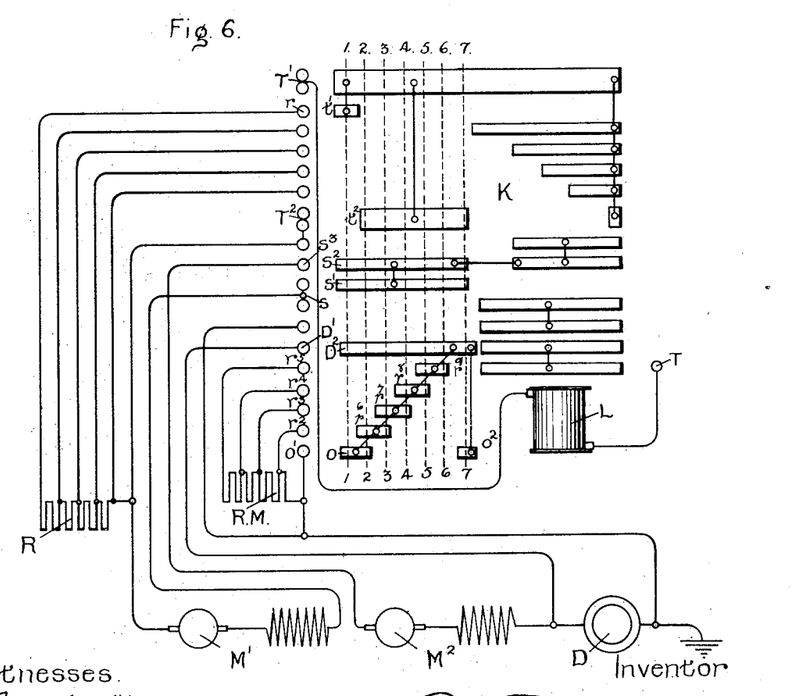
Fig. 6 is a plane development of an ordinary cylindrical motor-controller as adapted to carry out the invention, the apparatus itself and the electrical connections thereof being also shown.

In Fig. 6 is shown a plane development of an ordinary cylindrical series-parallel controller K, which has its contacts and connections modified, so that it is adapted to carry out the steps illustrated in Figs. 4 and 5. As before, the resistance R is intended for insertion in series with the motors for an instant at starting. It can also be cut in just before the motors go into parallel in order to cut down the current to reduce the arcing when the series connections are broken, and it can serve for the rheostatic control of the motors in their parallel position. It is preferable, however, to disconnect the motor $M^2$ from its axle before the controller connections are broken in order that the consequent increase of its counter electromotive force can be utilized to reduce the arcing at the controller-contacts. However, the resistance can also be cut in just before the motors go into parallel, if desired. The motor $M'$ is the rigidly-connected motor, and the motor $M^2$ is the one which is connected to its axle through the electrically-actuated clutch D. The resistance R M serves, as before, to vary the magnetization of the clutch D. The controller is connected to trolley through the magnetic blow-out coil L, which has its pole-pieces disposed in the well-known way to establish a field of force to blow out the arcs formed between the various contacts when the controller-cylinder is rotated. The other terminal of the coil L is connected to the fixed contact $T'$. In the first position of the controller the movable trolley-contact $t'$ engages the fixed contact $r$, and current flows through the resistance R and both motors $M'$ and $M^2$ in series to the return in shunt to the clutch D. This circuit may be traced as follows: from the contact $r$, through the resistance R, the motor $M'$, fixed contact S, movable contacts $S'$ and $S^2$, fixed contact $S^3$, motor $M^2$, fixed contact $D'$, movable contacts $D^2$, $r^9$, $r^8$, $r^7$, $r^6$, and O, and fixed contact $O'$, to the return. In the second controller position the movable contact $t'$ has passed from the fixed contact $r$, so that the resistance R is cut out of circuit. The movable trolley-contact $t^2$ is in engagement with the contacts $T^2$, so that the motors are connected in series, as before, and a portion of the resistance R M is cut in shunt to the clutch D, so that the clutch is partially magnetized and the motor $M^2$ begins to be connected with its axle. This circuit may be traced as follows: from the fixed contacts $T^2$, motor $M'$, fixed contact S, movable contacts $S'$ and $S^2$, fixed contact $S^3$, motor $M^2$, fixed contact $D'$, movable contacts $D^2$, $r^9$, $r^8$, $r^7$, $r^6$, and fixed contact $r^2$, through a portion of the resistance R M, to the return. In the successive positions of the controller (indicated at 3, 4, 5, and 6) the fixed contacts $r^3$, $r^4$, and $r^5$ are successively engaged and disengaged by the corresponding movable contacts $r^7$, $r^8$, and $r^9$, until in the sixth position the entire resistance R M is cut in the shunt around the clutch D, so that the latter is fully magnetized and the motor $M^2$ is rigidly connected with its axle. In the seventh position the motors are about to go into parallel, and the contact $O^2$ again short-circuits the clutch, so that the counter electromotive force of the motor $M^2$ serves to cut down the current to reduce the arcing when the series connections are broken. In the subsequent positions the motors are connected in parallel, the clutch D being continuously magnetized. The resistance R is cut in just before the series connections are broken and is gradually cut out in the customary manner. These circuits need not be traced, as the connections are made as usual, as indicated in the diagram. Furthermore, the diagram has been simplified by the omission of the motor-reversing contacts. If it is desired that the motors shall operate as generators in connection with the clutch D to brake the car, additional contacts may be mounted on the controller in any suitable manner well known to those skilled in the art or as disclosed in the application of Case above noted.

Figure 7:
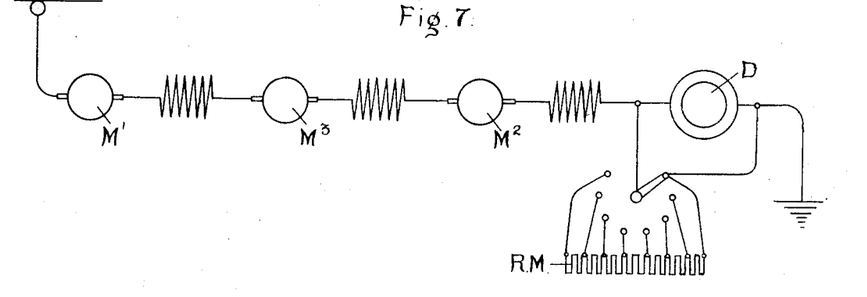
Figs. 7, 8, and 9 are working diagrams of the electrical connections during the successive steps of the combined counter-electromotive-force and series-parallel method of regulation.
Figure 8:
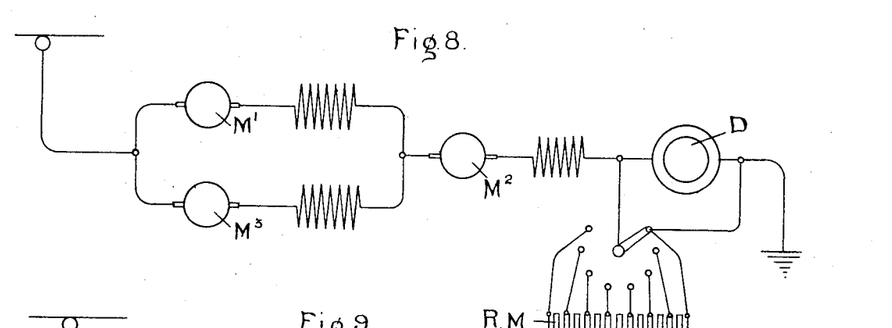
Figure 9:
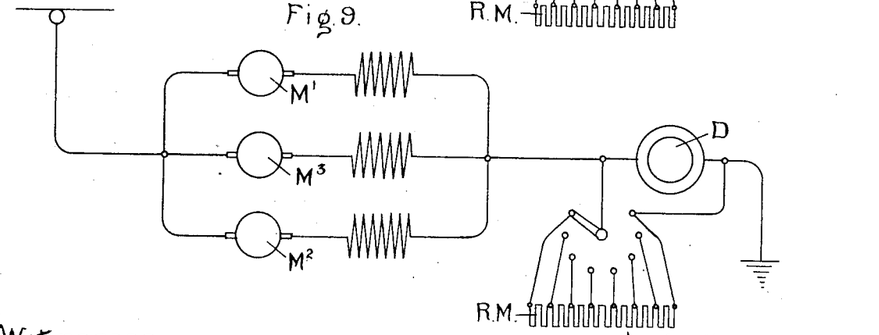
Figure 10:
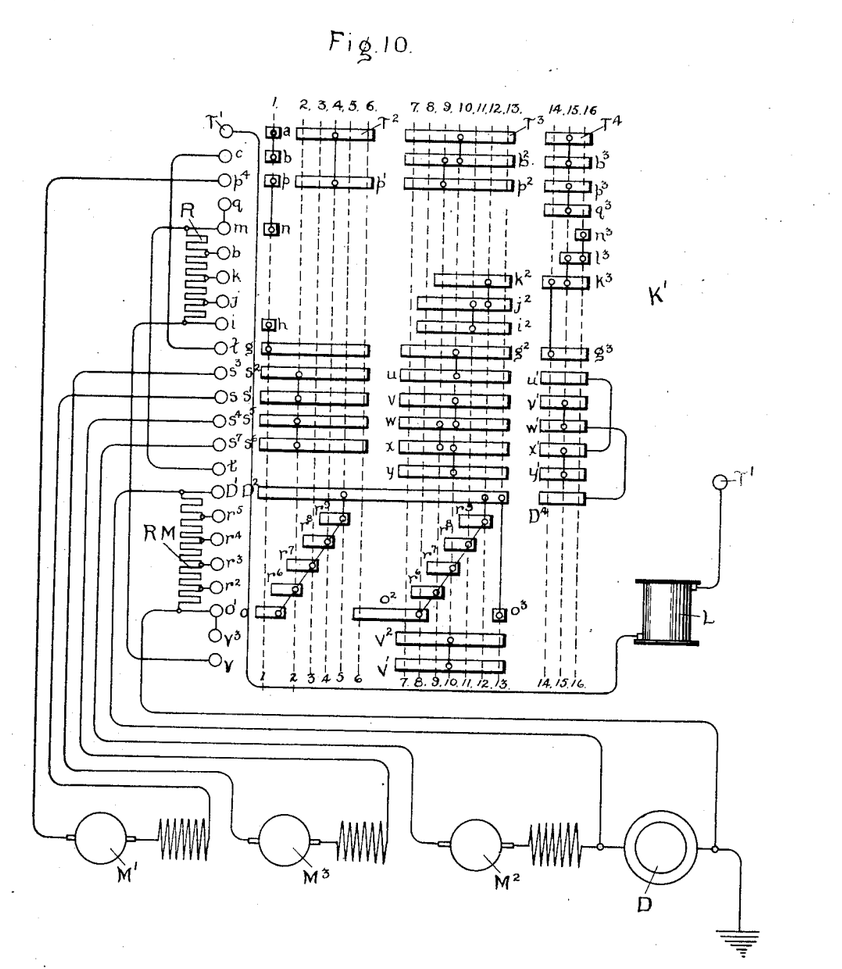
Fig. 10 is a plane development of an ordinary cylindrical controller as adapted to carry out the method of control indicated in Figs. 7, 8, and 9.

In Figs. 7, 8, and 9 is shown an application of the invention wherein the use of exterior dead resistance for the purpose of varying the speed of the motors may be entirely obviated. However, it may be advisable, inasmuch as the series-parallel method of control is an element of the system shown, that some resistance be temporarily inserted when changes are made from series to parallel in order to cut down the current to reduce the arcing and to prevent injury to the windings of the motors when first connected in parallel; but for this purpose also the clutch may be demagnetized before the series connections are broken, and as it is not magnetized when the parallel connections are first made the counter electromotive force of the unclutched motor serves in place of resistance to reduce arcing when the series connections are broken and to protect the rigidly-connected motors when they are first connected in parallel. At the same time, however, the dead resistance may be employed; but in such case it need not be so large as formerly, owing to the coöperation with it of the unclutched motor to reduce the arcing and prevent injury to the windings of the other motors. In fact the smaller dead resistances may be employed in combination with the clutch and loosely-mounted motor throughout the acceleration positions. From this it will be seen that the invention can be advantageously associated with the combined series-parallel and rheostatic methods of control with a resulting economy of operation. As shown in Fig. 7, there are three motors, which may be mechanically disposed with respect to the load in any suitable manner, such as that shown in Fig. 1. Two of the motors $M'$ and $M^3$ are to be rigidly connected with the load, as is the motor $M'$ of Fig. 1, and the third motor $M^2$ is intended to be connected to the load only through the electrically-actuated clutch D, as is the motor $M^2$ of Fig. 1. The motors $M'$ and $M^3$ may each have a separate axle, or one of them may be rigidly connected to a counter-shaft in turn connected to an axle. At starting all three motors are connected in series, with the clutch D short-circuited, as shown in Fig. 7, so that the unloaded motor $M^2$ immediately speeds up to generate electromotive forces opposed to the line. The motors $M'$ and $M^3$ will immediately begin to move the load, and the resistance R M may be then gradually inserted in shunt to the clutch D to gradually increase the magnetization thereof in order to vary the connection of the motor $M^2$ with the load. As before described, the speed and counter electromotive force of the motor $M^2$ will be gradually reduced, the motor will coöperate with the motors $M'$ and $M^3$ in driving the load, and as the potential around the motors $M'$ and $M^3$ is gradually increased they will speed up. Furthermore, the speed of the motor $M^2$ having been decreased by its connection with the load will again be increased, along with that of the motors $M'$ and $M^3$. Finally all three motors will be connected in series, each contributing its share of energy to drive the load. The next controlling step is shown in Fig. 8, where the rigidly-connected motors $M'$ and $M^3$ are connected in parallel and the loosely-mounted motor $M^2$ connected in series with both of said motors. The clutch D is again short-circuited, so that it is demagnetized, and when current is first supplied to the motors thus connected the motors $M'$ and $M^3$ being connected in parallel will have increased speed and torque, so that the speed of the load will be increased immediately. Before this new grouping was effected the motor $M^2$ had attained the full series speed, and after the clutch D was demagnetized and while the grouping of the motors $M'$ and $M^3$ was being changed the motor $M^2$ may have been maintained in circuit, so that it can freely speed up in order to prepare it for the sudden increase of current consequent upon the connection of the motors $M'$ and $M^3$ in parallel. Furthermore, if desirable, a resistance may be temporarily inserted in series until the motors $M'$ and $M^3$ have attained a speed corresponding to their parallel connection. As above described, however, in place of such resistance the clutch D may be demagnetized before the parallel connections of the motors $M'$ and $M^3$ are made. In such case the motor $M^2$ being left in series with the other two motors will speed up and generate counter electromotive forces, whereby the arcing when the series connections are broken will be considerably decreased, so that the arcs can be readily dissipated by the magnetic blow-out. Finally, the resistance R M can be gradually cut in shunt with the clutch D, thereby again magnetizing the clutch and gradually connecting the motor $M^2$ to the load, with a consequent gradual increase in line-voltage and also increased speed of the motors. The next motor grouping is shown in Fig. 9, where all the motors are connected in parallel to drive the load at full speed. The clutch D is fully magnetized, so that all three motors are rigidly connected to the load. The clutch D is shown in series with the three motors in parallel; but it is obvious that, if desired, it may be in series with only the motor $M^2$, as in the case shown in Figs. 4, 5, and 6. In changing to this new grouping of the three motors the clutch D may be continuously magnetized, so that the motor $M^2$ is maintained in rigid connection with the load and a resistance inserted in series with the motors temporarily until they shall have attained full speed, or the motor $M^2$ and shunted clutch D in series might be connected in parallel with the other two motors and the clutch D be then gradually magnetized. For the grouping shown in Figs. 8 and 9 it may sometimes be desirable to wind the motor $M^2$ with conductors of greater capacity than those which compose the windings of motors $M'$ and $M^3$ in order that the motor $M^2$ may not be injured by the increased flow of current through the motors $M'$ and $M^3$ when the latter are connected in parallel. An equivalent alternative is to insert a resistance in parallel with the motor $M^2$ when the motors $M'$ and $M^3$ are in parallel, and both methods may be employed together, if desired. In the controller $K'$ (shown in Fig. 10) I have shown a combination of the rheostatic, the series-parallel, and the counter-electromotive-force methods of regulation; but it will be understood that although the rheostatic feature may be advantageously employed nevertheless it can be almost, if not entirely, dispensed with. Fig. 10 has been simplified by the omission of the usual reversing contacts and connections, which can be added to a commercial controller in the usual manner by any one at all skilled in the art.

In Fig. 10 is shown a controller $K'$ as developed on a plane surface. The fixed and movable contacts and their connections are arranged to carry out the operations shown diagrammatically in Figs. 7, 8, and 9. The controller is connected to the trolley at T through the blow-out magnet L, which may have its pole-pieces arranged in the well-known manner to blow out the arcs formed when the connections are broken at the various contacts. The other terminal of the blow-out magnet is connected to the fixed contact $T'$. All the contacts indicated by small circles in a vertical line with the contact $T'$ are fixed, and all the other contacts are movable to the left by a right-hand revolution of the usual controller-handle. In the first position of the controller all the movable contacts along dotted line 1 are connected with their appropriate fixed contacts to connect all three motors $M'$, $M^2$, and $M^3$ directly to ground in shunt to the clutch D, as shown in Fig. 7, so that the motor $M^2$ can freely speed up. The clutch is intended, as before, to connect the motor $M^2$ with the load, and the motors $M'$ and $M^3$ are rigidly connected, as by gearing, with the load. The circuit in the first position of the controller may be traced as follows: from the fixed trolley-contact $T'$ through the contacts $a\ b\ c\ f\ g\ h\ i$, resistance R, contacts $m\ n\ p\ p^4$, motor $M'$, contacts $s\ s'\ s^2\ s^3$, motor $M^3$, contacts $s^4\ s^5\ s^6\ s^7$, motor $M^2$, contacts $D'\ D^2\ r^9$, &c., $o\ o'$, in shunt to clutch D, to ground. In this position the entire resistance R is inserted in series with the motors for a short interval to permit the motor $M^2$, which has considerable inertia, owing to its size, to speed up. In the second position of the controller this resistance is entirely cut out, and the circuit may be traced as follows: from the trolley-contact T' through contacts $T^2$ $p'$ $p^4$, motor M', contacts $s$ $s'$ $s^2$ $s^3$, motor $M^3$, contacts $s^4$ $s^5$ $s^6$ $s^7$, motor $M^2$, contacts D' $r^9$ to $r^6$ $r^2$, in shunt to the clutch D, to ground. Thus a small portion of the resistance R M is cut in shunt to the clutch-coils, so that the clutch begins to be magnetized and the motor $M^2$ to be connected with its axle. In the successive positions of the controller (numbered 3, 4, 5, and 6) the resistance R' is gradually cut in shunt to the clutch until finally in the last position all the resistance is cut in, and the clutch is fully energized. In this last or sixth position, however, the contact $o^2$ engages the contact $o'$ to completely short-circuit the resistance R M, so that the clutch is demagnetized, and the motor $M^2$ is permitted to again speed up to generate sufficient counter electromotive force to cut down the current before the series connection of the motors is broken in order to reduce the arcing at the contacts when such connection is broken, so that the arcs will readily be dissipated by the blow-out magnet L. It is clear that this action will take place also when the motors are changed from parallel to series. The clutch is not again energized until after the motors M' and $M^3$ are connected in parallel in order that considerable counter electromotive force may be opposed to the increased current, which tends to flow when such motors are connected in parallel and before their speed has increased. In order not to complicate the diagram, contacts for inserting the resistance R in series with the motors when they are first connected in parallel have not been shown; but, if desired, such contacts may be added to the controller in the usual manner familiar to those skilled in the art. In such case, however, the resistance thus inserted need not be as much as that which it has hitherto been necessary to insert, owing to the counter electromotive force generated by the motor $M^2$. In fact, I consider that the insertion of such dead resistance is not essential, and it may be resorted to only for the sake of additional protection. In the seventh position of the controller the motors M' and $M^3$ are connected in parallel, and the motor $M^2$ is connected in series with them, as shown in Fig. 8. I contemplate that the motor $M^2$ may have such capacity for the increased current flowing when the motors M' and $M^3$ are in parallel that it will not be necessary to insert a dead resistance in parallel with it; but in order to show how this resistance can be inserted the contacts are so arranged in the seventh position of the controller and in subsequent positions that the resistance R will be connected in parallel with the motor $M^2$. The circuits for the seventh position may be traced as follows: The circuit for the motor M' starts from the fixed trolley-contact T', through the contacts $T^3$ $b^2$ $p^2$ $p^4$, motor M', to the contacts $s$ $v$, the last of which is the contact where the circuits of the motors M' and $M^3$ meet. The circuit of the motor $M^3$ starts from the fixed trolley-contact T', through the contacts $T^3$ $b^2$ $c$ $f$ $g^2$ $u$ $s^3$, motor $M^3$, to contacts $s^4$ and $w$, the last of which is connected with the contact $v$, meeting the circuit of the motor M'. From the contacts $v$ and $w$ are two branches, one through the motor $M^2$ and the other through the resistance R, in parallel with said motor $M^2$. The circuit of the motor $M^2$, starting from the contact $w$, passes through the contacts $x$ $s^7$, motor $M^2$, contacts D' $D^2$ $r^9$, &c., to contacts $o^2$ $o'$ in, shunt to the clutch D, to ground. The circuit of the resistance R, in parallel to the motor $M^2$, starting from the contact $v$, passes through contacts $w$ $x$ $y$ $t$ up to and down through the resistance R, contacts V V' $V^2$ $V^3$ $o'$, in shunt to the clutch D, to ground. In the eighth position of the controller the circuits are the same as in the seventh position, except that the contact $r^6$ cuts a portion of the resistance R M in shunt to the clutch D, whereby the latter begins to be magnetized, and the contacts $i^2$ $j^2$ short-circuit a portion of the resistance R, which is in parallel with the motor $M^2$. The motor $M^2$ begins to be connected to the load by the partial magnetization of the clutch D. In the ninth position of the controller the only change is that more resistance is cut in shunt to the clutch by the contacts $r^7$ and $r^3$, and more resistance is short-circuited by the contacts $k^2$ and $k$ from the parallel connection with the motor $M^2$. In the tenth, eleventh, and twelfth positions the resistance R M is gradually cut into the shunt around the clutch until finally in the thirteenth position the clutch is fully energized. However, in the thirteenth position the contact $o^3$ engages the contact $o'$ to short-circuit the entire resistance R M, so that the motor $M^2$ can speed up and generate considerable counter electromotive force before the circuits are broken by a further movement of the controller to reduce the arcing before the other connections of the thirteenth position are broken. In the fourteenth position of the controller all three motors are in parallel, as shown in Fig. 9, and a part of the resistance R is in series with them. The circuits may be traced as follows: The circuit common to all the motors, starting from the fixed trolley-contact T', passes through the contacts $T^4$ $b^3$ $c$ $f$ $g^3$ $k^3$ $k$ up through a portion of the resistance R. At this point the circuit of the motor M' branches to the right through the contact $m$, and the circuits of the motors $M^2$ and $M^3$ branch to the left and down to the contact $t$. The circuit of the motor M', starting from the contact $m$, passes through the contacts $q$ $q^3$ $p^3$ $p^4$, motor M', contacts $s$ $v'$ $w'$ $D^4$ D', through the clutch D to ground. The circuits of both motors M² and M³ branch to the left from the upper portion of the resistance R and pass through the contacts $t$ and $y'$ to the contact $x'$, where the circuits separate. The circuit of the motor M² branching from the contact $x'$ passes through contact $s^7$, through motor M² and clutch D to ground. The circuit of the motor M³ branching from the contact $x'$ passes through the contacts $u'$ $s^3$, motor M³, contacts $s^4$ $w'$, the point where it joins the circuit of the motor M', through the contacts $D^4 D'$ and the clutch D to ground. In this fourteenth position of the controller the clutch D is not short-circuited, and hence is fully energized. The only changes made in the fifteenth position of the controller are that the contacts $l^3$ and $n^3$ engage the contacts $b$ and $n$, so that the resistance R is finally entirely cut out of circuit, and all three motors are rigidly connected to the load and are connected in parallel with each other to drive the load with maximum energy.

What I claim as new, and desire to secure by Letters Patent of the United States, is—

1. The combination with a load to be driven, of a plurality of electric machines adapted to act as motors to drive said load, a portion of said machines being rigidly connected with the load, and another portion of said machines in series with the rigidly-connected portion and having a variable connection with the load, whereby it serves to generate counter electromotive force variable step by step in opposition to the line, to vary the potential around the rigidly-connected motor portion, in proportion to the degree of its connection with the load, and a controlling-switch for supplying with line-current both the rigidly-connected and the variably-connected machines, and for controlling said variable connection.

2. The combination with a load to be driven, of a plurality of electric machines adapted to act as motors to drive said load, a portion of said machines being rigidly connected with the load, an electrically-actuated clutch by which another portion of the machines in series with the rigidly-connected portion can be connected with the load, to reduce the counter electromotive force generated by the portion adapted to be connected with the load by the clutch, a controlling-switch for supplying said machines with current, and auxiliary contacts operated by said switch to vary step by step the magnetization of said clutch.

3. The combination with a load to be driven, of a plurality of electric machines adapted to act as motors to drive said load, a portion of said machines being rigidly connected with the load, an electrically-actuated clutch, a second portion of said machines connected in series with the first portion and adapted to be connected with the load through said clutch, and serving to generate counter electromotive forces in opposition to the line in proportion to the degree of magnetization of said clutch, and a controller for supplying current to the electric machines and for varying step by step the degree of magnetization of the clutch.

4. The combination with a load to be driven, of an electric motor rigidly connected to drive said load, an electrically-actuated clutch, a second motor in series with the first motor and adapted to be connected with the load through said clutch, whereby the load serves to reduce its speed and counter electromotive force, and means for varying step by step the degree of magnetization of the clutch.

5. The combination with a plurality of car-axles, of electric motors connected in series, a portion of said motors having a slip connection with, and another portion being rigidly connected with, their respective axles, whereby the first motor portion may speed up and generate counter electromotive forces opposed to the line, means whereby the said loosely-connected motor portion can be connected step by step to its axle to vary its counter electromotive force, and a controlling-switch for supplying both motor portions with line-current.

6. The combination with a plurality of electric motors connected in series and adapted to be operatively connected to a common load, of means for varying step by step the counter electromotive force of only a portion of the motors, and a controlling-switch for supplying all the motors with line-current.

7. The combination with a plurality of electric motors, a portion thereof being rigidly connected with a load, another portion thereof being connected in series with said portion, a variable connection between the second portion and the load, whereby the inertia of the load can be employed to vary step by step the speed and counter electromotive force in the second portion independently of that of the first portion, and a controlling-switch for supplying all the motors with current from the line.

8. The combination with a plurality of electric motors adapted to drive a common load, of means whereby the counter electromotive force of a portion of the motors connected in series with another portion is decreased by the inertia of the load independently of such other portions, means for varying step by step the effect of said means, and a controlling-switch for supplying both motor portions with current from the line.

9. The combination with one or more electric motors rigidly connected with a load, of an auxiliary electric motor connected in series with said motor or motors and normally disconnected from the load, whereby it can speed up and generate counter electromotive forces opposed to the line to reduce the voltage around the rigidly-connected motors, means for connecting the auxiliary motor to the load by degrees, so that the load is driven by varying portions of the momentum of the speeding-motor, and the inertia of the load serves to reduce the speed and counter electromotive force of said motor by degrees or step by step, and thereby increases step by step the potential around the other motors, and a controlling-switch for supplying all the motors with line-current.

10. The combination with a load to be driven, of a plurality of electric machines adapted to act as motors to drive said load, an electrically-actuated clutch in series with said machines by which a portion of the motors normally disconnected from the load and connected in series with another portion rigidly connected with the load, can be connected with the load, to reduce the counter electromotive force of the motor so connected, means for varying step by step the degree of magnetization of said clutch, and a controller constructed and arranged to supply current to the machines and to control said means for varying the clutch magnetization.

11. The combination with a load to be driven, of a plurality of electric machines adapted to act as motors to drive said load, an electrically-actuated clutch in series with said machines, by which a normally-disconnected portion of the machines in series with a rigidly-connected portion can be connected with the load to reduce the counter electromotive forces generated by such disconnected portion; and a variable resistance in shunt to the coils of the clutch, by which the magnetization of the same can be varied to vary step by step the counter electromotive force generated by the normally-disconnected portion of the machines.

12. The combination with a plurality of electric motors adapted to act as motors to drive a load, a portion of the machines being rigidly connected with the load, and another portion of the machines in series with the first portion being connected with the load through a variable connection, of means for varying step by step the connection of the second portion with the load, to vary the potential around the rigidly-connected machines, means for grouping the rigidly-connected machines in different ways to vary their torque and speed, and means for supplying all the machines with line-current.

13. The combination with a plurality of electric machines adapted to act as motors to drive a load, a portion of the machines being rigidly connected with the load, and another portion of the machines being normally disconnected from the load, means for grouping the machines in different ways to vary their torque and speed, means for varying step by step the degree of connection of the normally-disconnected motor portion with the load while the machines are grouped in a certain way, and means for supplying all the machines with line-current.

14. The combination with a plurality of electric machines adapted to be connected with a load, of a controller for said machines, and means for disconnecting a portion of the machines from the load prior to the breaking of the circuit by the controller, whereby the counter electromotive forces generated by the portion thus disconnected serve to reduce the arcing at the controller-contacts.

15. The combination with an electric machine adapted to be connected with a load, of a controller for said machine, and means for disconnecting said motor from its load prior to the breaking of the circuit by the controller, whereby the counter electromotive force generated by the machine serves to reduce the arcing at the controller-contacts.

16. The combination with a plurality of electric machines adapted to drive a load, of a controller for connecting the motors in series and parallel, and means operated by the controller before it breaks connections, for disconnecting a portion of the motors from the load to reduce the arcing at the controller-contacts.

17. The combination with a plurality of electric machines adapted to drive a load, of a single controller for independently varying step by step the counter electromotive forces of a portion of the motors, which controller also connects the motors in series and parallel relations.

18. In a controller for electric motors, the combination with contacts constructed and arranged to change the groupings of the motor-coils to vary the torque and speed of the motors, of auxiliary contacts constructed and arranged to disconnect a portion of the machines from the load prior to the breaking of the circuits at the first-mentioned contacts.

19. In a controller for electric machines, the combination with contacts constructed and arranged to change the groupings of the motor-coils to vary the torque and speed of the motors, of auxiliary contacts constructed and arranged to increase the counter electromotive force of a portion of the motors prior to the breaking of the circuits at the first-mentioned contacts.

20. In a controller for electric motors, the combination with contacts constructed and arranged to supply the motors with current, of auxiliary contacts constructed and arranged to increase the counter electromotive force of a portion of the motors prior to the breaking of the circuit at the first-mentioned contacts, whereby arcing is reduced.

21. In a controller for electric motors, the combination with contacts constructed and arranged to supply the motors with current; of contacts constructed and arranged to increase the counter electromotive force prior to the breaking of the circuit at the first-mentioned contacts; and contacts constructed and arranged to insert exterior dead resistance in series in the motor-circuit prior to the breaking of the circuit at the first-mentioned contacts; the two latter sets of contacts coöperating to reduce the arcing at the first-mentioned contacts when the circuit is broken thereat.

22. The combination with a plurality of electric machines adapted to act as motors each constructed to normally generate the same counter electromotive force, of a controlling-switch for supplying said machines with line-current and for changing the grouping of the coils of the motors to vary the torque and speed of the latter, and auxiliary contacts operated by said controller for varying the counter electromotive force of only a portion of said machines.

23. The combination with a plurality of electric machines adapted to act as motors each constructed to normally generate the same counter electromotive force, of a controlling-switch for supplying said motors with line-current, and auxiliary contacts operated by said switch for varying the counter electromotive force of only a portion of said machines.

24. The combination with a plurality of electric machines adapted to drive a load each machine being constructed to normally generate the same counter electromotive force, of a single controlling-switch which connects the machines in series and parallel relations, and means operated by said controller for varying the counter electromotive force of a portion of said machines.

25. The combination with a load to be driven, of a plurality of electric machines adapted to act as motors to drive said load, a portion of said machines being rigidly connected with the load, an electrically-operated clutch by which another portion of the machines in series with the rigidly-connected portion can be connected with the load, to reduce the counter electromotive force generated by the portion adapted to be connected with the load by the clutch, and a controlling-switch which connects the motor portions in series and parallel and by which the clutch is energized by degrees or step by step while the two motor portions are connected in series, and by which the clutch is completely energized while the motor portions are connected in parallel.

26. The combination with a load to be driven, of a plurality of electric machines adapted to act as motors to drive said load, a portion of said machines being rigidly connected with the load, an electrically-operated clutch by which another portion of the machines in series with the rigidly-connected portion can be connected with the load, to reduce the counter electromotive force generated by such other portion, a shunt around said clutch, a resistance, and a controlling-switch which connects the two motor portions in series and in parallel, by which switch the resistance is cut step by step into the shunt to the clutch while the motor portions are connected in series, and by which switch also the resistance is maintained in the shunt to the clutch while the motor portions are connected in parallel.

27. The combination with a load to be driven, of a plurality of electric machines adapted to act as motors to drive said load, a portion of said machines being rigidly connected with the load, an electrically-operated clutch by which another portion of the machines in series with the rigidly-connected portion can be connected with the load, to reduce the counter electromotive force generated by the first motor portion, and means for changing step by step the degree of magnetization of said clutch.

28. The combination with a vehicle having a plurality of axles, of a plurality of electric machines adapted to act as motors to drive the vehicle, a portion of said machines being rigidly connected with its axle or axles, an electrically-actuated clutch by which another portion of the machine which is in series with the first portion can be connected with its axle, and means for changing step by step the degree of magnetization of said clutch.

29. The combination with a plurality of electric motors electrically connected in series with each other, and which are mechanically connected independently to drive a load common to all, of means for varying step by step the counter electromotive force of only a portion of said motors, and a controlling-switch for supplying line-current to all said motors and for changing the grouping of the coils of the motors to vary the torque and speed of the latter.

30. The combination with a plurality of electric machines adapted as power-motors to drive a common load, of means whereby the counter electromotive force of a portion of said motors connected in series with another portion is reduced by the inertia of the load, means for varying step by step the degree of such reduction, and a controlling-switch for supplying all the motors with line-current and for controlling said means of reducing the counter electromotive force of a portion of the motors.

31. The combination with a plurality of motors mechanically connected to perform useful work and electrically connected in series with each other, of means for varying step by step the degree of work done by a portion of the motors, whereby the counter electromotive force of such portion is varied, and a controlling-switch for connecting all the motors to line and for controlling said means.

32. The combination with a plurality of electric motors arranged to drive a common load, a portion of the motors being rigidly connected with the load, of an electrically-operated clutch for connecting another motor portion with the load, and a controller by which the motors are first connected in series so that the rigidly-connected motor portion will start to drive the load, and the other motor portion will speed up and generate counter electromotive forces opposed to line, said controller being constructed and arranged so that in its subsequent positions the clutch is energized step by step, whereby the speed of the motor portion connected to the load by the clutch is gradually reduced by the inertia of the load, and the load is driven by the moment of the speeding motor portion.

33. In a controller for a plurality of electric motors, the combination with contacts arranged to change the grouping of the motor-coils to vary the torque and speed of the motors, of auxiliary contacts arranged to vary step by step the counter electromotive force of only a portion of the motors.

34. In a controller for a plurality of electric motors, the combination with contacts constructed and arranged to change the grouping of the motor-coils, to vary the torque and speed of the motors, of contacts constructed and arranged to insert exterior resistance in series with the motors, and contacts constructed and arranged to vary step by step the counter electromotive force of only a portion of the motors.

35. The combination with a plurality of electric motors, a portion thereof being rigidly connected with the load, of an electrically-operated clutch for connecting another portion of the motors with the load, and a controller constructed and arranged to first connect the motors in series without energizing the clutch, and to then energize the clutch step by step.

In witness whereof I have hereunto set my hand this 19th day of April, 1901.

PHILIP FARNSWORTH.

Witnesses:
BENJAMIN B. HULL,
MARGARET E. WOOLLEY.